United States Patent
Cantaloube

(10) Patent No.: US 10,452,382 B2
(45) Date of Patent: Oct. 22, 2019

(54) METHOD FOR PROCESSING AN UPDATE FILE OF AN AVIONIC EQUIPMENT OF AN AIRCRAFT, A COMPUTER PROGRAM PRODUCT, RELATED PROCESSING ELECTRONIC DEVICE AND PROCESSING SYSTEM

(71) Applicant: THALES, Courbevoie (FR)

(72) Inventor: Christian Cantaloube, Toulouse (GB)

(73) Assignee: THALES, Courbevoie (FR)

( * ) Notice: Subject to any disclaimer, the term of this patent is extended or adjusted under 35 U.S.C. 154(b) by 153 days.

(21) Appl. No.: 15/491,621

(22) Filed: Apr. 19, 2017

(65) Prior Publication Data

US 2017/0308371 A1  Oct. 26, 2017

(30) Foreign Application Priority Data

Apr. 21, 2016 (FR) ...................................... 16 00665

(51) Int. Cl.
| | |
|---|---|
| *H04L 29/06* | (2006.01) |
| *G06F 8/65* | (2018.01) |
| *H04L 9/32* | (2006.01) |
| *G06F 21/57* | (2013.01) |
| *G06F 21/64* | (2013.01) |

(52) U.S. Cl.
CPC ............... *G06F 8/65* (2013.01); *G06F 21/57* (2013.01); *G06F 21/645* (2013.01); *H04L 9/3242* (2013.01)

(58) Field of Classification Search
CPC .......... G06F 8/65; G06F 21/57; G06F 21/645; H04L 9/3242
See application file for complete search history.

(56) References Cited

U.S. PATENT DOCUMENTS

| | | | |
|---|---|---|---|
| 8,452,475 B1* | 5/2013 | West ...................... | G07C 5/008 701/29.1 |
| 9,311,481 B1* | 4/2016 | Wawda ................. | H04L 63/145 |
| 2003/0109973 A1* | 6/2003 | Hensey ............... | H04L 63/0853 701/32.6 |
| 2004/0177058 A1* | 9/2004 | Carpentier ............ | G06F 16/954 |

(Continued)

OTHER PUBLICATIONS

Preliminary Search Report for FR 16 00665, completed Jan. 3, 2017.

*Primary Examiner* — Sarah Su
(74) *Attorney, Agent, or Firm* — B. Aaron Schulman, Esq.; Stites & Harbison, PLLC

(57) ABSTRACT

This method makes it possible to validate an update file of at least one set of computer data of a piece of avionics equipment of an aircraft. The processing method is implemented within a processing system comprising a mobile terminal independent of the aircraft, an update unit integrated into the aircraft, and a database separate from the aircraft and the mobile terminal, and comprises obtaining a computed message digest, the computed message digest resulting from the application, by the update unit, of a cryptographic hash function to the update file, obtaining a reference message digest, the reference message digest being acquired by the mobile terminal by secure access to a database comprising the reference message digest, and processing the update file based on a comparison of the computed message digest with the reference message digest.

9 Claims, 4 Drawing Sheets

(56) References Cited

U.S. PATENT DOCUMENTS

| | | | |
|---|---|---|---|
| 2006/0174109 A1* | 8/2006 | Flynn | G06F 9/4406 |
| | | | 713/164 |
| 2009/0138516 A1* | 5/2009 | Young | G06F 8/61 |
| 2010/0031050 A1 | 2/2010 | Schulz et al. | |
| 2010/0082982 A1* | 4/2010 | Suzuki | G06F 21/32 |
| | | | 713/168 |
| 2010/0138298 A1* | 6/2010 | Fitzgerald | G06F 21/88 |
| | | | 705/14.53 |
| 2011/0145919 A1* | 6/2011 | Whelihan | G06F 21/57 |
| | | | 726/22 |
| 2012/0066751 A1* | 3/2012 | Nutaro | G06F 21/606 |
| | | | 726/7 |
| 2012/0089578 A1* | 4/2012 | Lam | G06F 17/30159 |
| | | | 707/692 |
| 2012/0177198 A1* | 7/2012 | Cabos | H04L 9/0825 |
| | | | 380/270 |
| 2013/0036103 A1 | 2/2013 | Lawson et al. | |
| 2013/0227540 A1 | 8/2013 | Ruster et al. | |
| 2015/0261966 A1* | 9/2015 | Mensch | G06F 21/57 |
| | | | 713/189 |
| 2015/0360796 A1 | 12/2015 | Huet et al. | |
| 2016/0378457 A1* | 12/2016 | Adachi | G06F 9/445 |
| | | | 713/181 |
| 2017/0003956 A1* | 1/2017 | Chang | G06F 8/654 |
| 2017/0090909 A1* | 3/2017 | Guo | G06F 8/66 |
| 2019/0149322 A1* | 5/2019 | Bar-Nahum | H04L 9/085 |
| | | | 380/278 |

* cited by examiner

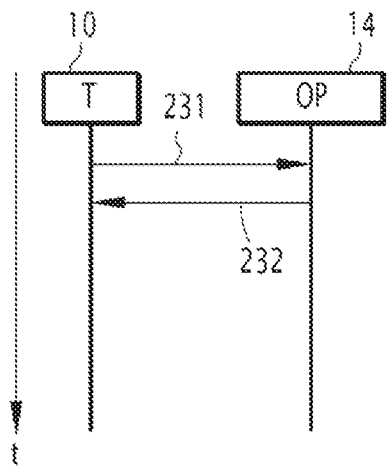
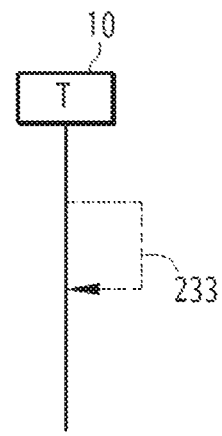
FIG.8        FIG.9
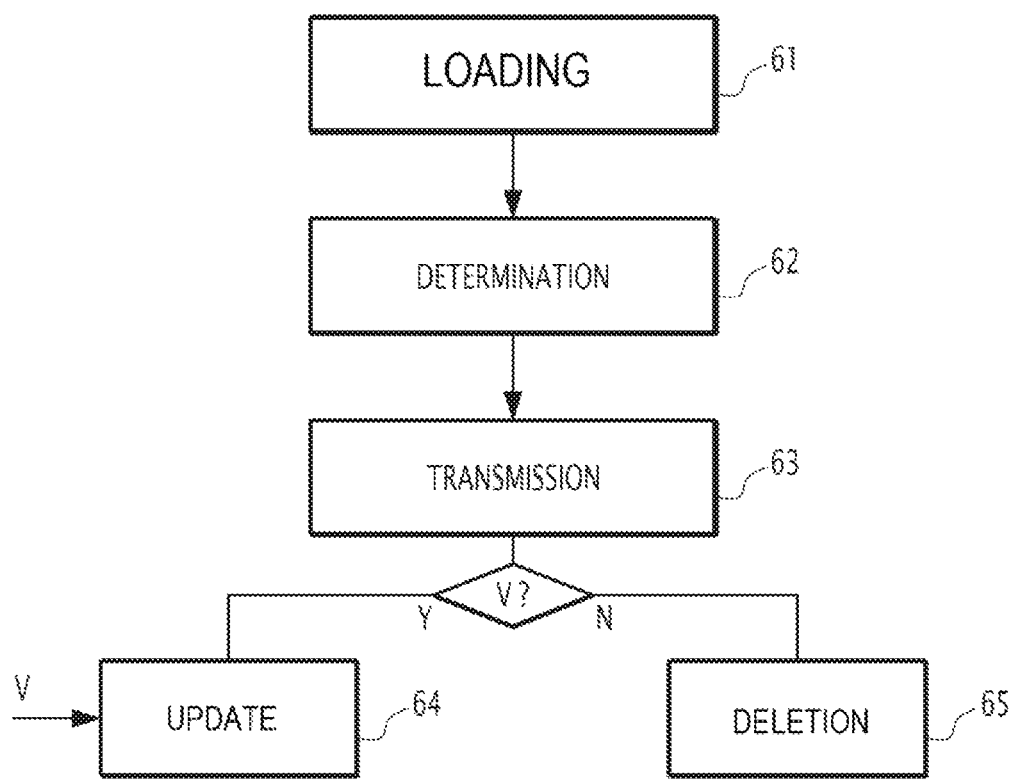
FIG.10

METHOD FOR PROCESSING AN UPDATE FILE OF AN AVIONIC EQUIPMENT OF AN AIRCRAFT, A COMPUTER PROGRAM PRODUCT, RELATED PROCESSING ELECTRONIC DEVICE AND PROCESSING SYSTEM

FIELD OF THE INVENTION

The present invention relates to a method for processing an update file of at least one set of computer data of a piece of avionics equipment of an aircraft, the processing method being implemented within a processing system comprising a mobile terminal independent of the aircraft, an update unit integrated into the aircraft, and a database separate from the aircraft and the mobile terminal.

The invention also relates to a computer program product including software instructions which, when implemented by an information processing unit integrated into a processing system of the aforementioned type, implements such a processing method.

The invention also relates to an electronic device for processing an update file of at least one set of computer data of a piece of avionics equipment of an aircraft, the electronic processing device being configured to be integrated into a system for processing an update file, the processing system comprising a mobile terminal independent of the aircraft, an update unit integrated into the aircraft, and a database separate from the aircraft and the mobile terminal.

The invention also relates to a system for processing an update file of at least one set of computer data of a piece of avionics equipment of an aircraft, the processing system comprising at least: a mobile terminal independent of the aircraft, an update unit integrated into the aircraft, and a database separate from the aircraft and the mobile terminal.

The invention applies to the field of avionics, and more particularly to the field of systems for updating software components and databases of avionics equipment of an aircraft, such as an airplane or helicopter, or a drone.

BACKGROUND OF THE INVENTION

Traditionally, such an update is done either by transferring files (i.e., data sets) stored on mobile storage peripherals such as hard drives, USB (Universal Serial Bus) drives, laptop computers, or by sending data via communication links, such as radio communication links.

The integrity of such an operation to update data onboard a piece of avionics equipment is critical with respect to flight safety and the proper progression of navigation operations. To ensure such integrity, solutions based on the application of a cryptographic hash function to the update files, the result of which is called message digest, or hash value, or digital imprint, are implemented.

One example of this type of solution is in particular described in document US 2013/036103 A1.

According to this document, a comparison between a computed message digest and a reference message digest previously stored in an integrity module of the aircraft is implemented to validate the update.

However, this solution implemented within the aircraft proves ineffective when an ill-intentioned third party manages to penetrate the update system of the aircraft. Furthermore, this solution requires a prior and recurring update of the reference message digests stored within the integrity module of the aircraft, these reference message digests in turn being data files whose integrity must be protected within the aircraft.

To resolve this, solutions based on an electronic signature combining the aforementioned message digest technique and encryption by asymmetrical key exchange have been proposed.

Nevertheless, these solutions are logistically complex to implement because the encryption assumes a distribution on the one hand of public keys to the aircraft and on the other hand of private keys to the equipment manufacturers delivering the updates to be installed, as well as management over time of the validity of these keys and the associated certificates (for example, in case of verification).

SUMMARY OF THE INVENTION

One aim of the invention is therefore to propose a method for processing an update file, making it possible to improve security during the update of at least one set of computer data of a piece of avionics equipment of an aircraft, while facilitating performance of the update.

To that end, the invention relates to a method for processing an update file of the aforementioned type, the processing method comprising the following steps:
  obtaining a computed message digest, associated with the update file, the computed message digest resulting from the application, by the update unit, of a cryptographic hash function to the update file,
  obtaining a reference message digest, associated with the update file, the reference message digest being acquired by the mobile terminal by secure access to a database comprising the reference message digest,
  processing the update file based on a comparison of the computed message digest with the reference message digest.

"Update file" refers to a software program or a data set.

"Set of computer data of a piece of avionics equipment" refers to a software part or a database of the avionics equipment on which the update file is applied.

"Obtain" refers to "directly" or "indirectly" obtaining an object. For example, according to a first processing system architecture, the obtainment of the computed message digest is "direct" during the determination done by the update unit, and according to a second architecture, "indirect" when the mobile terminal obtains the previously computed message digest determined by the update unit.

According to other advantageous aspects of the invention, the processing method comprises one or more of the following features, considered alone or according to all technically possible combinations:
  the comparison of the computed message digest with the reference message digest comprises obtaining a comparison indicator comprising:
    the acquisition of the comparison indicator entered by an operator, or
    the automatic implementation of the comparison of the computed message digest with the reference message digest,
  the method further comprises storing the comparison indicator,
  when the method is implemented by the mobile terminal, the obtainment of the computed message digest comprises:
    receiving the computed message digest sent by the update unit, or receiving the computed message digest entered by an operator, or an acquisition, based on optical recognition of the computed message digest, on a retrieval screen of the aircraft, when the method is implemented by the update unit, the obtainment of the reference message digest comprises:

receiving the reference message digest sent by the mobile terminal, or receiving the reference message digest entered by an operator, or an acquisition, based on optical recognition of the reference message digest, on a retrieval screen of the mobile terminal, the processing of the update file based on a comparison of the computed message digest with the reference message digest comprises:

validating the update file when the computed message digest is identical to the reference message digest, or deleting the update file when the computed message digest is different from the reference message digest.

The "processing of the update file" therefore broadly encompasses the processing operations that allow the validation (for example, by generating a validation associated with the update file, or by acquiring the validation associated with the update file entered by an operator) or deleting the update file.

The invention also relates to a computer program product including software instructions which, when implemented by an information processing unit integrated into a processing system of the aforementioned type, implements such a processing method as defined above.

The invention also relates to an electronic processing device of the aforementioned type, wherein the electronic processing device comprises:

a module for obtaining a computed message digest, associated with the update file, the computed message digest resulting from the application, by the update unit, of a cryptographic hash function to the update file, a module for obtaining a reference message digest, associated with the update file, the reference message digest being acquired by the mobile terminal by secure access to a database comprising the reference message digest, a module for processing the update file based on a comparison of the computed message digest with the reference message digest.

The invention also relates to a system for processing an update file of the aforementioned type, in which:

the mobile terminal comprises at least one module for obtaining a reference message digest, associated with the update file, the reference message digest being acquired by the mobile terminal by secure access to a database comprising the reference message digest, the update unit comprises at least one module for obtaining a computed message digest, associated with the update file, the computed message digest resulting from the application, by the update unit, of a cryptographic hash function to the update file, and the mobile terminal, or the update unit, comprises a module for processing the update file based on a comparison of the computed message digest with the reference message digest.

According to another advantageous aspect of the invention, the processing system is such that the update unit is an electronic unit integrated into the avionics equipment, or an electronic unit separate from the piece(s) of avionics equipment of the aircraft.

BRIEF DESCRIPTION OF THE DRAWINGS

These features and advantages of the invention will appear more clearly upon reading the following description, provided solely as a non-limiting example, and done in reference to the appended drawings, in which:

FIG. 10 is a flowchart of the steps reciprocally carried out by the update unit when the method according to the invention is implemented by an electronic processing device integrated into the mobile terminal, according to a first architecture of the processing system as illustrated in FIG. 1.

DETAILED DESCRIPTION OF PREFERRED EMBODIMENTS

Figure 1:
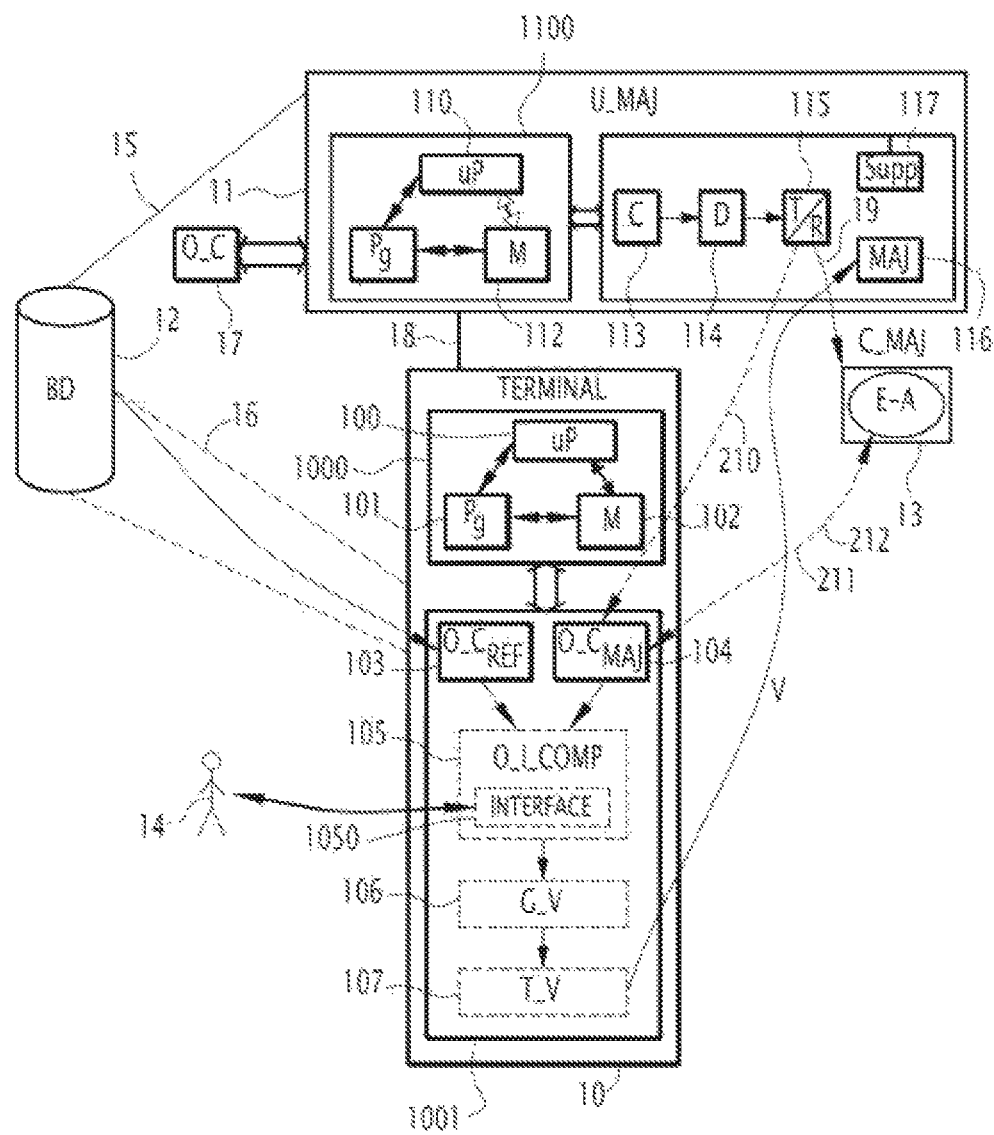
FIG. 1 is a schematic view of an example architecture of a system for processing an update file according to the invention comprising a mobile terminal, an update unit connected to a piece of avionics equipment of an aircraft, and a database separated from the aircraft and the mobile terminal.
Figure 2:
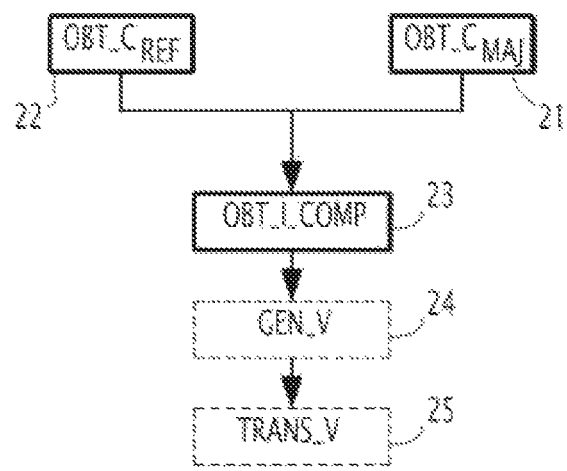
FIG. 2 is a flowchart of a method for processing an update file according to the invention.

In FIG. 1, a system for processing an update file according to the invention comprises at least one mobile terminal 10 able to be carried by a maintenance operator 14, the latter being responsible for installing an update of a set of computer data for a piece of avionics equipment of an aircraft (not shown). The mobile terminal 10 is therefore able to be moved, and located outside or inside the aircraft.

The system for processing an update file also comprises at least one unit 11 for updating the set of computer data of a piece of avionics equipment of the aircraft.

Such an update unit 11 can be integrated into the aircraft and is usable for the maintenance of a plurality of separate pieces of avionics equipment, or dedicated to a particular piece of avionics equipment.

In other words, according to a first alternative, the update unit 11 is dedicated to a particular piece of avionics equipment and is physically part of this piece of avionics equipment (i.e., the update unit is a subassembly of a piece of avionics equipment).

According to a second alternative, the update unit 11 is a piece of avionics equipment as such of the aircraft (i.e., physically autonomous with respect to the other pieces of avionics equipment) and can be used to update one or several other separate pieces of avionics equipment.

Furthermore, the system for processing an update file comprises a database 12 remote from the aircraft, and also remote from the mobile terminal 10.

Such a database 12 for example corresponds to a computer system on the ground, hosted at a certified avionics equipment manufacturer of the aircraft manufacturer, at the manufacturer of the aircraft or at the company operating the aircraft, and incorporates a strong authentication module using signatures/certificates (for example, from the original producer).

Additionally, the update system also comprises a retrieval screen 13 located on the aircraft, for example one of the screens of the cockpit.

According to a first alternative, the system for processing an update file comprises a tool 17 for loading the update file(s), independent from the update unit 11, and whose integrity is complex to guarantee lastingly.

According to a first example, such a loading tool 17 is a medium: i.e., a removable storage medium such as a USB drive, a memory card, a data disc (CD/DVD). In this case, the update unit 11 comprises, or is connected, via a wireless or wired link, to, a media reader (not shown) compatible with the medium 17 used.

According to a second example, the loading tool 17 is a laptop computer comprising a memory (i.e., hard drive) in which the update file is stored, and a media reader. In this case, the laptop computer is also connected to the update unit (11) via a wired or wireless link.

According to another alternative, the update file(s) are sent by the database 12 to the update unit 11 using a data link 15 of the public network (not shown), such as a radio data link, or a wired link, for example, if the aircraft passes through a maintenance workshop.

The mobile terminal 10 and the database 12 communicate via a secure communication network, for example using a VPN (Virtual Private Network) link 16.

The mobile terminal 10, independent of the aircraft, comprises a first information unit 1000 for example formed by a first processor 100, and a first memory 102 associated with the first processor 100.

The mobile terminal 10 is for example a smartphone managed by an operating system, such as the Android operating system by Google®, or according to another example, a touch-sensitive tablet, and further comprises a radio antenna and a radio transceiver (not shown), the transceiver being connected to the information processing unit 1000. Furthermore, such a mobile terminal 10 comprises a keypad, a screen, and for example, a digital camera.

According to one optional aspect, the mobile terminal 10 is also configured to exchange with the update unit 11, using a data link 18, such as a radio data link or a wired link.

According to one particular aspect, the mobile terminal 10 is configured to implement a Teopad® security solution by the company Thales®.

The mobile terminal 10 is carried by the maintenance operator 14 and is therefore independent from the database 12 and the aircraft comprising the avionics equipment to which the update unit 11 is connected. Thus, a same mobile terminal 10 is for example usable by the operator 14 to update a same set of computer data of a same piece of avionics equipment of several aircraft.

Several architectures for systems processing an update file according to the invention can be implemented.

A first architecture corresponds to the system for processing an update file as shown in FIG. 1. According to this first architecture example, the mobile terminal 10 comprises an electronic device 1001 for processing an update.

Such an electronic device for processing an update 1001 first comprises a first module 104 for obtaining, via the data link 18, a computed message digest associated with the update file, the computed message digest resulting from the application, by the update unit 11, of a cryptographic hash function to the update file, According to a first alternative embodiment, this first obtainment module 104 comprises a radio transceiver (not shown) that receives the computed message digest, sent by the update unit 11, directly via the data link 18.

According to the first alternative, it is therefore possible for the maintenance operator 14 carrying the mobile terminal 10 to be at a distance from the aircraft, as long as the radio transceiver of the mobile terminal remains within the transmission range of the update unit 11.

Furthermore, the data link 18 used by the radio transceiver is designed to avoid the introduction of a bait file by an ill-intentioned third party during the communication between the update unit 11 and the mobile terminal 10.

According to a second alternative embodiment, this first obtainment module 104 comprises a module for receiving the computed message digest entered by the operator 14. Such a receiving module (not shown) for example corresponds to the keypad of the mobile terminal 10.

According to a third alternative embodiment, this first obtainment module 104 comprises an acquisition module (not shown) configured to read the computed message digest, or an image representative of the computed message digest, on the retrieval screen 13 of the aircraft. Such an acquisition module (not shown) in this case corresponds to a digital camera of the mobile terminal 10, or advantageously comprises an object recognition module (not shown) such as an image (for example, a QR (Quick Response) code reader or a string of characters.

The electronic device for processing an update file 1001 also comprises a second module 103 for obtaining, via the secure access using the secure link 16, a reference message digest associated with the update file, certified and stored in the database 12 remote from the aircraft and the mobile terminal 10.

According to one particular aspect, the activation of this second obtainment module 103 is synchronized with the first obtainment module 104 using a synchronization module (not shown), such that once the computed message digest is received, the second obtainment module 103 is activated to access the database 12 in real time.

According to another aspect, the activation of this second obtainment module 103 precedes the obtainment of the computed message digest. In this case, the second obtainment module 103 is connected to the first memory 102 of the terminal so as to be configured to store the reference message digest therein obtained prior to the computed message digest.

The electronic device for processing an update file 1001 also optionally comprises a module for obtaining a comparison indicator 105 comparing the computed message digest with the reference message digest. This module for obtaining a comparison indicator 105 is connected to the first and second modules for obtaining the reference message digest, and the computed message digest, respectively, as described above.

According to a first alternative, this module for obtaining a comparison indicator 105 comprises a man-machine interface 1050 allowing an interaction with the operator 14.

Such a man-machine interface 1050 for example comprises a retrieval screen, a speaker, and an entry module (not shown), such as a keypad (which may or may not be touch-sensitive) or voice-recognition software.

This man-machine interface 1050 is configured to allow the operator 14 to see to the comparison of the computed message digest with the reference message digest and mentally obtain a result of the comparison, then enter this comparison result.

According to a second alternative, this module for obtaining a comparison indicator 105 is configured to carry out the comparison automatically (i.e., without operator intervention) of the reference message digest and the computed message digest.

Furthermore, according to the first architecture example of a system for processing an update file as shown in FIG. 1, the electronic device for processing an update file 1001 of the mobile terminal 10 comprises a module for processing the update file comprising a module 106 for generating a validation of the update file, in particular when the module for obtaining a comparison indicator 105 is configured to carry out the comparison automatically (i.e., without operator intervention). Such a module 106 for generating a validation of the update file is connected to the module for obtaining a comparison indicator 105 described above.

This generating module 106 is configured to deliver a validation V automatically (i.e., without operator intervention) when the module for obtaining a comparison indicator 105 automatically delivers a positive result representative of identity between the reference message digest and the computed message digest. For example, if the message digests are images, a positive result corresponds to an identical reference image and image associated with the update file. If the message digests are of type SHA-1, i.e., words of 160 bits, the reference message digest is equal, i.e., identical, to the computed message digest, and the bits of the reference message digest and the computed message digest are identical in pairs.

According to the first architecture example of a processing system illustrated by FIG. 1, the module for processing the update file of the electronic processing device 1001 integrated into the mobile terminal 10 also comprises a transmission module 107 for sending the validation V to the update unit 11.

According to the example architecture of the processing system illustrated by FIG. 1, the update unit 11 also comprises a second information unit 1100 formed for example by a second processor 110, and a second memory 112 associated with the second processor 110.

Furthermore, the update unit 11 comprises a module 113 for loading the update unit 11 with the update file in a temporary zone of the memory 112.

This loading module 113 is for example a USB port, a Bluetooth® port (i.e., a port according to standard IEEE 802.15) or an NFC (Near Field Communication) port, configured according to a first alternative to communicate with the loading tool 17. According to a second alternative, the loading module 113 corresponds to a radio receiver, an Ethernet port or a Wi-Fi receiver (according to standard IEEE 802.11) configured to receive the update file, sent directly from the database 12 via a data link 15 of the public communication network.

The update unit 11 also comprises a module 114 for determining a computed message digest. This determination module 114 is configured to apply a cryptographic hash function to the update file, the result of which is called message digest, or hash value, or digital imprint.

In other words, a message digest corresponds to an "imprint" representative of the update file making it possible to characterize it distinctly (in principle, a file cannot be modified without its message digest changing).

The determination module 114 is a computer using a program computing a message digest similar (in formula/algorithm terms) to that or those implemented within the database 12, since it is able to apply the same cryptographic hash function as that implemented by the database 12.

The update unit 11 also comprises a module 115 for sending the computed message digest from the received update file. According to one particular aspect, as illustrated by FIG. 1, such a transmission module 115 is a transmission-reception module configured to send, as well as receive data.

This transmission module 115 is connected on the one hand to the aforementioned determination module 114, and on the other hand, according to a first alternative, to the mobile terminal 10 via a data link 18, or according to a second alternative, to the retrieval screen 13 via a wired or wireless link 19.

According to one optional aspect of the invention, the transmission link 18 or 19 used between the transmission module 115 and the receiving entity, i.e., the mobile terminal 10 or the retrieval screen 13 of the aircraft, is secured or segregated so as to avoid any possible baiting by replacing the computed message digest with a valid message digest.

The update unit 11 further comprises a module 116 for updating the set of computer data of the avionics equipment of the aircraft.

Such an update module 116 is, according to the example first architecture illustrated by FIG. 1, activated in the presence of a validation of the update file received from the mobile terminal. To that end, this update module 116 is connected to the transmission-reception module 115 of the update unit 11, the transmission-reception module 115 being configured to receive data from the mobile terminal 10 via a data link 18 of the public communication network. Such an update module 116 is configured to definitively load the update file from its memory 112 toward the avionics equipment whose computer data set is affected by the update file.

The update unit 11 also optionally comprises a module 117 for deleting the update file from the temporary zone of the second memory 112. Such a deletion module 117 is activated in the absence of validation received from the mobile terminal 10 by the aforementioned reception module. In other words, such a deletion module 117 is configured to block the use of the update file.

According to one optional alternative, the update unit 11 also comprises a counter (not shown) connected to the aforementioned transmission module 115, the reception module and the deletion module 117 described above. Such a counter is configured to measure the time elapsed from the transmission, by the update unit 11, of the computed message digest, and to activate the deletion module 117 in the absence of validation received from the mobile terminal beyond a predetermined period of time.

According to a second example architecture (not shown) of the system for processing an update file, the electronic device for processing an update file 1001 is integrated within the update unit 11 instead of being integrated in the mobile terminal 10.

According to this second architecture of the processing system, the mobile terminal 10 still comprises the second module 103 for obtaining, via the secure access to the database 12 using the secure link 16, a reference message digest associated with the update file.

Furthermore, according to this second architecture of the processing system, according to one option (not shown), the mobile terminal 10 comprises a module for sending the reference message digest to the update unit 11.

According to a second option, the screen of the mobile terminal 10 is configured to retrieve the reference message digest automatically or on request.

According to this second architecture of the processing system where the update unit 11 comprises the electronic processing device 1001, the update unit then also comprises a method for obtaining (i.e., "indirect" obtainment) a reference message digest integrated into the electronic processing device 1001.

According to a first option, the module for obtaining the reference message digest of the processing device integrated into the update unit 11 comprises a receiving module configured to receive the reference message digest sent by the transmission module of the mobile terminal 10.

According to a second option, the module for obtaining the reference message digest of the processing device integrated into the update unit 11 comprises a receiving module configured to receive the reference message digest entered by the operator 14.

According to a third option, the module for obtaining the reference message digest of the processing device integrated into the update unit 11 comprises an acquisition module configured to implement optical recognition of the reference message digest on a retrieval screen of the mobile terminal.

According to this second architecture, the module for obtaining a computed message digest, associated with the update file, is the module 114 for determining a computed message digest, previously described relative to the first architecture shown by FIG. 1.

Similarly to the first processing system architecture previously described, according to the second architecture where the electronic processing device is integrated into the update unit, the electronic processing device 1001 optionally comprises a module 105 for obtaining a comparison indicator of the computed message digest with the reference message digest. According to a first alternative, this obtainment module 105 comprises a man-machine interface 1050 allowing an interaction with the operator 14. According to a second alternative, this obtainment module 105 is configured to carry out the comparison automatically (i.e., without operator intervention) of the reference message digest and the computed message digest.

According to this second processing system architecture where the electronic processing device 1001 is integrated into the update unit 11, the validation transmission module 107 as described relative to the first architecture, where the electronic processing device is integrated into the mobile terminal 10, is not necessary.

Thus, according to this second architecture, the module for processing the update file comprises the module 106 for generating a validation V of the update file, the update module 116 and the deletion module 117 as described relative to the first architecture, in particular when the obtainment module of a comparison indicator 105 is configured to carry out the comparison automatically (i.e., without operator intervention).

According to a third example architecture of the system for processing an update file ((not shown), the electronic device for processing an update file 1001 is "exploded" between the mobile terminal 10 and the update unit 11.

In other words, on the one hand, the mobile terminal 10 still comprises the second module 103 for obtaining, via the secure access to the database 12 using the secure link 16, a reference message digest associated with the update file. Furthermore, according to this third architecture, the screen of the mobile terminal 10 is configured to retrieve the reference message digest for the operator 14.

On the other hand, the update unit 11 comprises at least one module for obtaining a computed message digest, associated with the update file, the computed message digest resulting from the application, by the update unit 11, of a cryptographic hash function to the update file, this module for obtaining a computed message digest being the module 114 for determining a computed message digest previously described in relation with the first architecture shown by FIG. 1. Furthermore, according to this third architecture, the screen of the aircraft 13 is configured to retrieve the computed message digest for the operator 14.

According to this third architecture, the module for processing the update file based on a comparison of the computed message digest with the reference message digest comprises a man-machine interface 1050 allowing the acquisition of a validation (or a request for deletion of the update file) entered by the operator 14, who himself performs the comparison between the computed message digest and the reference message digest mutually retrieved by the screen 13 of the aircraft and the screen of the mobile terminal 10.

Such a processing module is integrated either into the mobile terminal 10 or the update unit 11.

When the processing module is integrated into the mobile terminal 10, it optionally comprises the transmission means 107 for transmitting the validation to the update unit 11.

When the processing module is integrated into the update unit 11, the update module 116, previously described relative to the first architecture, is activated in the presence of the validation entered by the operator 14.

The processing of an update file, as implemented within the first architecture of the processing system illustrated by FIG. 1, will now be described using FIGS. 2 to 10, respectively.

According to the first architecture, the validation of an update as such is implemented by the mobile terminal 10 previously described and assumes an interaction, as described below, with the update unit 11 on the one hand, which loads the update data and implements the update if applicable, and the database 12 on the other hand, which serves as reference for the validation.

One skilled in the art will understand that the method for processing an update file described below is one example embodiment among others making it possible to validate an update file via a validation system according to the invention. Such a method described in relation to the first validation system architecture is easy to transpose to the other two validation system architectures previously described.

First of all, according to the validation method implemented in the validation system whereof a first architecture is illustrated in FIG. 1, the update unit 11 implements a step 61 for loading update data into a temporary zone of its memory 112. According to a first alternative, such a loading step 61 is carried out from the loading tool 17 connected to the loading module 113 of the update unit 11. According to a second alternative, such a loading step 61 corresponds to the reception by the loading module 113 of the update file sent by a data link 15 of the public network by the database 12.

Once the loading step 61 for this data has been done, the update unit 11 carries out a step 62 for determining the message digest associated with them by applying a cryptographic hash function, certified and identical to that implemented by the database 12.

For example, such a cryptographic hash function is of type SHA-1, SHA-2, SHA-224, SHA-256, SHA-3, etc. According to the invention, any type of hash function is implemented so as to deliver a message digest, or "imprint" representing at least one update file whose integrity must be checked before actually carrying out the update.

When the update requires a plurality of update files, the hash function is:

according to a first example, applied to the entire plurality so as to deliver a message digest for the entire plurality, or according to a second example, applied to a group of update files of the plurality, or according to a third example, applied to each file of the plurality so as to deliver as many message digests as there are files in the plurality, etc.

Figures 3, 4:
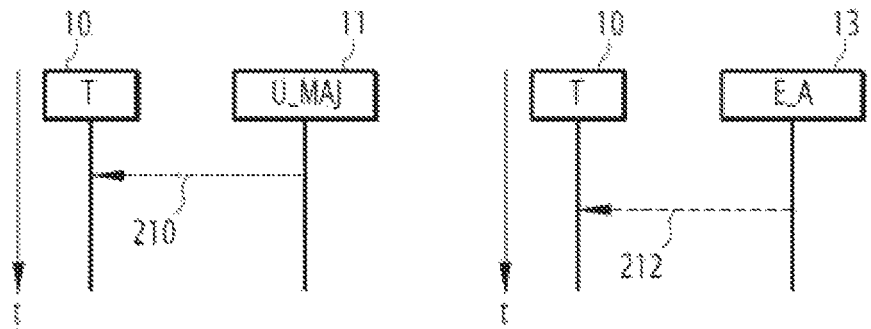
FIGS. 3 to 5 illustrate three embodiments of the step for obtaining a computed message digest of the processing method illustrated by FIG. 2, FIGS. 6 and 7 illustrate two embodiments of the step for obtaining a reference message digest of the processing method illustrated by FIG. 2, FIGS. 8 and 9 illustrate two embodiments of the step for obtaining a comparison indicator of the processing method illustrated by FIG. 2.

Once the determination step 62 is carried out, the update unit 11 implements a step 63 for sending this computed message digest either, according to a first alternative illustrated by FIG. 3, directly to the mobile terminal 10 of the operator 14, via a radio or wired link, dedicated or secure, or, according to a second alternative illustrated by FIG. 4, to the retrieval screen 13 of the aircraft.

This transmission step 63 optionally comprises additional identification information of the update file, such as an identifier, a version number, the source or the author of this update file. Such additional identification information in particular makes it possible to facilitate the management and traceability of the update files.

Reciprocally, the mobile terminal 10 implements a first step 21 for obtaining the computed message digest. According to the first alternative described above and illustrated by FIG. 3, the mobile terminal 10 implements a step 210 for receiving the computed message digest, sent by the update unit 11, via a radio or wired link, dedicated or secure.

According to the second alternative illustrated by FIG. 4, such a first obtainment step 21 by the mobile terminal 10 comprises an acquisition step 212, for example by reading, by the retrieval screen 13 of the aircraft to which the update unit 11 has sent the computed message digest.

Such an acquisition step 212 is for example based on an optical recognition of the computed message digest.

Figure 5:
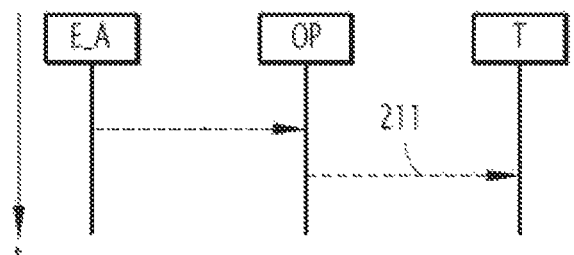

According to the third alternative illustrated by FIG. 5, such a first obtainment step 21 by the mobile terminal 10 comprises a step 211 for receiving the computed message digest entered by the operator 14, once the operator 14 has read the computed message digest retrieved by the retrieval screen 13.

The mobile terminal 10 also carries out a second step 22 for obtaining a reference message digest also associated with the set of computer data of the avionics equipment to be updated.

Figure 6:
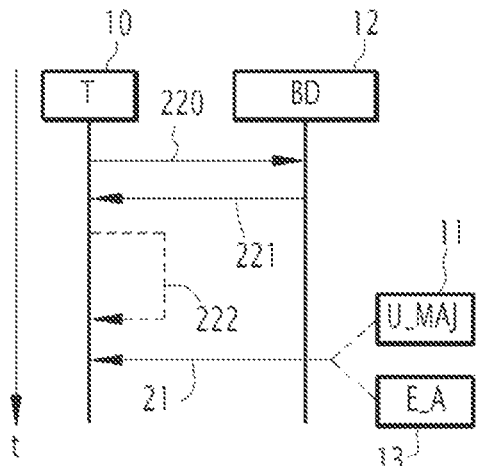

According to a first alternative illustrated by FIG. 6, the mobile terminal 10 carries out a second step 221 for obtaining this reference message digest independently of the implementation moment of the first step 21 for obtaining the computed message digest.

Indeed, according to this alternative, the mobile terminal 10 carries out a step 220 for sending a request to obtain reference message digest(s) intended for the database 12 prior to a maintenance operation carried out by the operator 14 carrying the mobile terminal 10.

Once the reference message digest has been obtained according to the second obtainment step 221, the mobile terminal 10 carries out a step 222 for storing the reference message digest on a zone of the first memory 102 and waits for the performance of the first obtainment step 21 of the computed message digest to carry out the subsequent steps of the update validation method as described below.

Figure 7:
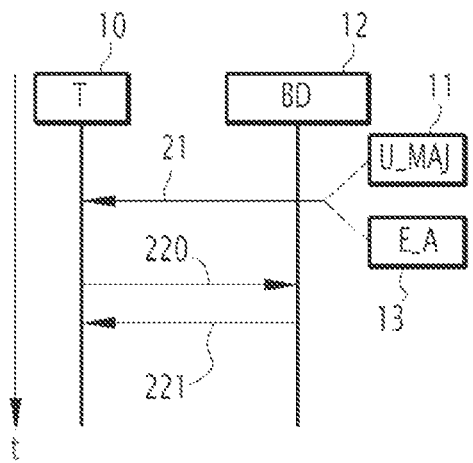

According to a second alternative illustrated by FIG. 7, the mobile terminal 10 waits for the first step 21 to obtain the computed message digest to be carried out in order to implement a step 220 for sending a request to obtain the corresponding reference message digest from the database 12. According to this alternative, the mobile terminal 10 carries out the second step 221 in real time to obtain the reference message digest. The implementation moment of the second step 221 to obtain the reference message digest according to this second alternative therefore depends directly on the implementation moment of the first step 21 by the mobile terminal 10 to obtain the computed message digest.

Once the update message digest and the reference message digest have been obtained according to the first and second obtainment steps 21, 22, respectively, the mobile terminal 10 carries out a step 23 to obtain a comparison indicator of these two message digests.

According to a first alternative illustrated by FIG. 8, the comparison as such is done by the operator 14 using a man-machine interface 1050. For example, the reference message digest and the computed message digest are retrieved during a step 231 for retrieval on the screen of the man-machine interface 1050 or using a speaker.

The operator 14 himself carries out the comparison and implements a step 232 for entering an indicator representative of the result of this comparison. Such an indicator for example corresponds to the entry, by the operator 14, of the message "OK", when the comparison result is positive, and "KO" when the result of the comparison is negative. Such a message is for example textual and entered using a keypad (which may or may not be touch-sensitive). According to another example, such a message is vocal and entered using a voice recognition tool. According to another example, such a message is entered by pressing an "OK" key of the keypad or a "KO" key of the keypad.

Any other pair of comparison indicators may be used to represent the result of the comparison carried out by the operator, such as the use of green and red keys or a binary code 0 and 1, etc.

According to a second alternative illustrated by FIG. 9, the mobile terminal 10 is configured to carry out the comparison step 233 of the two message digests automatically, in particular by using optical object recognition.

Thus, according to this second alternative, the implementation of the step 23 for obtaining the comparison indicator does not require any intervention by the operator 14. According to one optional step, the comparison indicator is stored (step not shown), for example in the memory 102 of the mobile terminal 10, or directly in a memory of the database 12 (i.e., in this case, the mobile terminal 10 sends the comparison indicator to the database 12 via the secure link 16). Such storage for example comprises creating a log file for the verification in progress.

Such a log file optionally comprises additional identification information of the update file, such as an identifier, a version number, the source or author of this update file, or information relative to the validation, such as the date and time, the name of the operator 14.

Such storage is for example automatic and systematic or done upon request by the operator, in particular via a software application of the mobile terminal, the software application being accessible via the man-machine interface 1050 previously described.

Optionally, the comparison indicator is next used by the mobile terminal 10 in a step 24 for generating, if applicable, a validation V of the update data loaded on the update unit 11.

More specifically, when the comparison indicator represents a positive comparison result (i.e., the computed message digest and the reference message digest are identical), the validation V allowing processing of the update file is generated during the generating step 24, then sent to the update unit 11 during a transmission step 25.

Upon receiving this validation V (Y in FIG. 10), the update unit 11 carries out a step 64 for updating the set of computer data of the avionics equipment.

Conversely, when the comparison indicator represents a negative comparison result (i.e., the computed message digest and the reference message digest are different), the validation V is not generated or sent by the mobile terminal 10 to the update unit 11.

The update unit 11 not receiving this validation (N in FIG. 10), it then carries out a step 65 for deleting update data from the temporary zone 112 of the update unit 11.

According to one alternative embodiment, such a deletion step 65 is implemented, by the update unit 11, upon expiration of a predetermined period measured by a counter of the update unit 11.

Thus, the present invention proposes to "outsource" the update authorization operation to a mobile terminal 10 independent of the aircraft on which the update data is loaded to update at least one component piece of avionics equipment.

Such outsourcing makes it more complex to carry out effective malevolent modifications. Indeed, according to the present invention, in order to corrupt the update without this corruption being detected, it is necessary to corrupt the update data, the update unit 11 located on the aircraft and the mobile terminal 10 of an operator, which may be located outside the aircraft, all at the same time.

In other words, the present invention proposes to distribute different steps necessary to perform a secure update by dividing them between the database 12 serving as a certified reference, the update unit 11, which, for a given update file, computes an associated computed message digest, and the mobile terminal 10, which makes it possible to check this reference digest computed by the update unit 11, by obtaining, through a secure access path to the database 12, the reference message digest associated with the update file, the reference message digest needing to be compared with the computed message digest, such a comparison being done by an operator or automatically as previously described.

The invention claimed is:

1. A method for processing an update file of at least one set of computer data of a piece of avionics equipment of an aircraft, the processing method comprising:
   obtaining a computed message digest associated with the update file by the application by an update unit integrated into the aircraft of a cryptographic hash function to the update file,
   obtaining a reference message digest not stored on the aircraft, associated with the update file and acquired by a mobile terminal independent of the operation of the aircraft by secure access to a database separate from the aircraft and the mobile terminal, said database comprising the reference message digest, and
   processing the update file based on a comparison of the computed message digest with the reference message digest.

2. The processing method according to claim 1, wherein the comparison of the computed message digest with the reference message digest comprises obtaining a comparison indicator comprising:
   the acquisition of the comparison indicator entered by an operator, or
   the automatic implementation of the comparison of the computed message digest with the reference message digest.

3. The processing method according to claim 2, wherein the method further comprises storing the comparison indicator.

4. The processing method according to claim 1, wherein, when it is implemented by the mobile terminal, the obtainment of the computed message digest comprises:
   receiving the computed message digest sent by the update unit, or
   receiving the computed message digest entered by an operator, or
   an acquisition, based on optical recognition of the computed message digest, on a retrieval screen of the aircraft.

5. The processing method according to claim 1, wherein, when it is implemented by the update unit, the obtainment of the reference message digest comprises:
   receiving the reference message digest sent by the mobile terminal, or
   receiving the reference message digest entered by an operator, or
   an acquisition, based on optical recognition of the reference message digest, on a retrieval screen of the mobile terminal.

6. The processing method according to claim 1, wherein the processing of the update file based on a comparison of the computed message digest with the reference message digest comprises:
   validating the update file when the computed message digest is identical to the reference message digest, or
   deleting the update file when the computed message digest is different from the reference message digest.

7. An electronic device for processing an update file of at least one set of computer data of a piece of avionics equipment of an aircraft,
   wherein the electronic processing device comprises a processor for processing the update file based on a comparison of:
      a computed message digest, associated with the update file, the computed message digest resulting from the application, by an update unit integrated into the aircraft, of a cryptographic hash function to the update file, with a reference message digest not stored on the aircraft associated with the update file, the reference message digest being acquired by a mobile terminal independent of the operation of the aircraft by secure access to a database separate from the aircraft and the mobile terminal, said database comprising the reference message digest;
   wherein the electronic processing device is configured to be integrated into a system for processing the update file, said system comprising the mobile terminal independent of the operation of the aircraft, the update unit integrated into the aircraft, and the database separate from the aircraft and the mobile terminal.

8. A system for processing an update file of at least one set of computer data of a piece of avionics equipment of an aircraft, said processing system comprising:
   a mobile terminal independent of the operation of the aircraft that is configured for obtaining a reference message digest not stored on the aircraft, associated with the update file, the reference message digest being acquired by the mobile terminal by secure access to a database comprising the reference message digest, said database being separate from the aircraft and the mobile terminal, and an update unit integrated into the aircraft that is configured for obtaining a computed message digest, associated with the update file, the computed message digest resulting from the application, by the update unit, of a cryptographic hash function to the update file, wherein the mobile terminal, or the update unit, is configured for processing the update file based on a comparison of the computed message digest with the reference message digest.

9. The processing system according to claim 8, wherein the update unit is an electronic unit integrated into the avionics equipment, or an electronic unit separate from the piece(s) of avionics equipment of the aircraft.

\* \* \* \* \*